Oct. 2, 1951     C. O. KNOX     2,569,722
VACUUM INSECT ERADICATING DEVICE FOR SHOWCASES
Filed Sept. 2, 1947     2 Sheets-Sheet 2

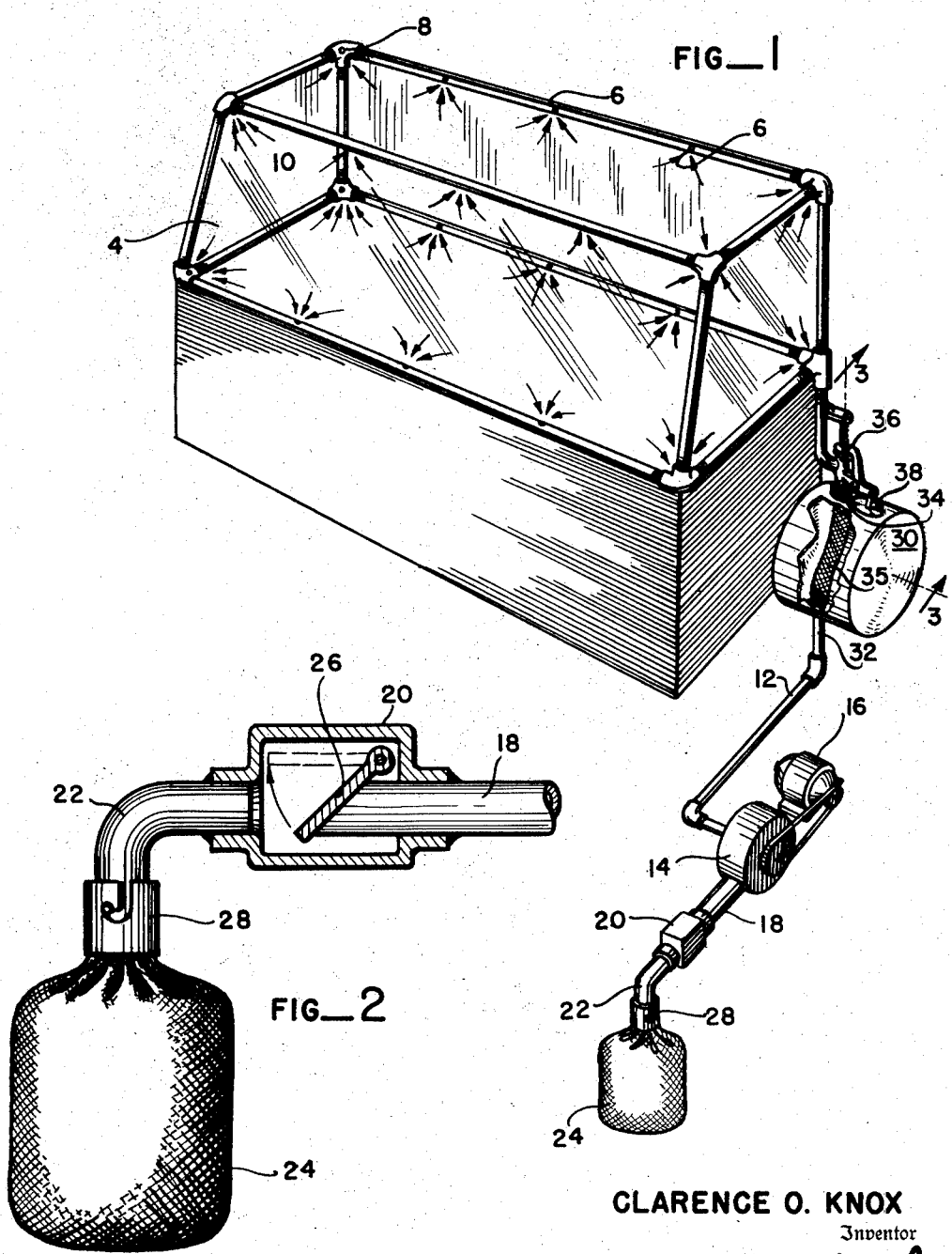

CLARENCE O. KNOX
Inventor

By Smith & Tuck
Attorneys

Patented Oct. 2, 1951

2,569,722

UNITED STATES PATENT OFFICE 2,569,722

VACUUM INSECT ERADICATING DEVICE FOR SHOWCASES

Clarence O. Knox, Seattle, Wash.

Application September 2, 1947, Serial No. 771,761

3 Claims. (Cl. 43—139)

My present invention relates to the art of insect control devices and, more particularly, to a vacuum insect eradicating device for show cases.

The control of insects has long been a very perplexing problem, and, aside from annoyance and inconvenience encountered, it has been proved that the control of insects, particularly the housefly, is very important in the handling of foodstuffs and the like.

In the past, many devices have been submitted for this purpose and it is known that numerous devices using vacuum or suction have been so used. My present invention is of this general class and has for its purpose the providing of adequate vacuum-controlled suction, so as to cause the necessary draft to draw an insect into the suction opening and then to carry it to a point where it can be disposed of.

The principal object of my invention, therefore, is to provide a frame-like tubular member, having a plurality of suction orifices and having the same coupled to means for disposing of the collected insects.

A further object of my invention is to provide a tubular frame-member, having suction openings disposed in the corners and ends of a showcase or entrance or ante-way so that the limited amount of suction that it is practical to create can be most advantageously employed.

A further object of my invention is to provide, in a multiple-opening suction device, an insect-collecting means, so that after the insects have been removed from the show-case or other confined space, they may be conveniently handled and disposed of.

Further objects, advantages and capabilities will be apparent from the description and disclosure in the drawings, or may be comprehended or are inherent in the device.

In the drawings:

Figure 1 is a perspective view showing a form of show-case framing, particularly adaptable to my insect eradicating means.

Figure 2 is an enlarged view, partly in section, showing the means for disposing of the collected insects.

Figure 3:
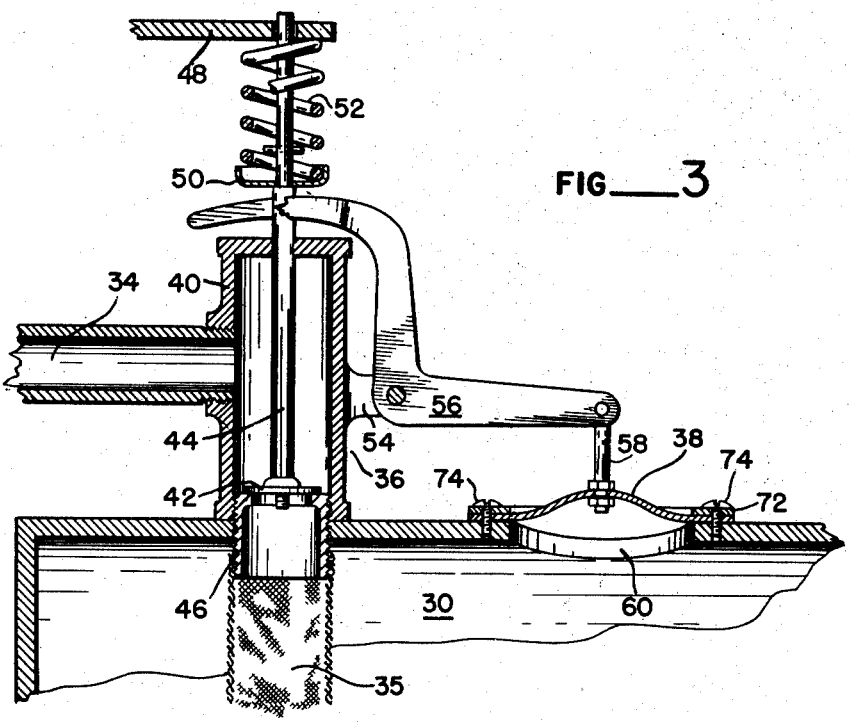
Figure 3 is an enlarged view, partly in section, taken on line 3—3 of Figure 1.

Referring more particularly to the disclosure in the drawings, the numeral 4 designates generally a show-case frame or a framework that may be disposed within a show-case having its own frame, such a show-case normally having glass for enclosing the sides, top and ends.

As it will be noted in Figure 1, I provide my frame as a plurality of connected tubes. Each of the longitudinal tubular members is provided with a plurality of suction openings 6. I further provide that in each of the corner members suction openings as 8, 10, are employed. In this way, suction is made available at the usual resting place of insects, and high velocity can be obtained, even though it be of but short range, in sufficient amount to draw the insect into the suction opening. Openings 6, 8 and 10 are large enough to pass a large insect, such as a large fly.

Suction is applied to the framework 4 by means of the suction pipe means 12, which in turn is connected to the centrifugal suction fan 14. This fan, as distinct from the piston type of pump, should be of the type that has considerable body clearance, so that there will be no tendency for insects to be crushed, and a sufficient depth of the same accumulated to prevent the operation of the suction pump, as so often occurs in the usual type of piston displacement pump. A type of interleaving rotor pump made generally after the broad principles of the root blower has been found quite satisfactory for this type of use. My vacuum producing gear may be conveniently housed in the lower portion of the show-case as shown in Figure 1.

In some instances it is desirable to have my device operate on an intermittent cycle so that a considerable volume may be evacuated and thus higher velocities may be obtained at the suction openings 6, 8, and 10.

The suction fan may be operated by an convenient source of power, as by the electric motor indicated at 16. The output of the fan is pipe 18, which is provided with a check valve arranged at 20, a discharge pipe 22, and a pervious collector bag 24. A gravity check valve, having the gravity-operated gate 26, has been found very useful in preventing the insects from climbing back through the device if they have not been killed, and further permits the building up of a higher degree of vacuum if the device is operated on the suggested intermittent plan.

A suitable device for providing intermittent operation is shown in detail in Figure 1 and in Figure 3. Pipe 34 is connected to framework 4 and valve means 36 is interposed between pipe 34 and chamber 30. Pipe 32 is disposed on the other side of chamber 30; and a tube of screen 35 connects to valve means 36 and pipe 32 so that insects will be routed through chamber 30. Pipe 34 is threaded into one side of valve housing 40. Disposed for vertical movement in housing 40 is valve 42 and valve stem 44. A valve seat 46 is provided in the lower end of housing 40. The upper end of valve stem 44 is guided by an opening in bracket 48 secured to pipe 34. Disc 50 is secured to valve stem 44 above housing 40 and spring 52 encircles valve stem 44 between disc 50 and bracket 48. Pivot member 54 is secured to the side of housing 40 and pivotally supports bell-crank 56. One end of bell-crank 56 is slotted and encircles valve stem 44 below disc 50. The other end of bell-crank 56 is connected to diaphragm 38 by pivotal link 58. Chamber 30 has an opening 60 over which diaphragm 38 is secured by means of annular ring 72 and screws 74. Valve 42 is normally closed under urgence of spring 52. When a sufficient degree of vacuum is built up in chamber 30, diaphragm 38, acting through bell-crank 56 pressing upward on disc 50, overcomes the pressure of spring 52 and valve 42 is opened.

The opening of valve 42 creates a rush of air momentarily through the various orifices as 6, 8, and 10 and overcomes the insects which usually collect in the corners and thus the eradication of the insects is achieved with a minimum of power expended.

It has been found that the disposal of the insects after they have been collected by the system is still a considerable problem, and to this end I have provided the pervious bag 24, having a removable sleeve member 28 which permits the easy removal of the bag, and then by twisting the same, the sealing of the bag. After this, the insects may be destroyed by any convenient method. One that I have found very satisfactory is by the means of fumes such as sulphur or many of the new insecticides which kill on contact or by the fumes. In cases where such an arrangement is permissible, due to convenient location of an incinerator, it is desirable to have the discharge pipe 22 connected directly to a fire box or furnace so that the insects can be burned.

It is believed that it will be clearly apparent from the above description and the disclosure in the drawings that the invention comprehends a novel construction of a vacuum insect eradicating device for show-cases.

Having thus described my invention, I claim:

1. A vacuum insect eradication device, consisting of: an interconnected tubular frame adapted to fit into an insect control area with the tubular members disposed in the corners thereof; there being directed intake orifices disposed at each intersection of said tubular members; there being inwardly directed intake orifices disposed on certain of the longitudinal tubular members; a vacuum pump; drive means for said vacuum pump; a vacuum accumulator including a tank disposed intermediate said tubular frame and said vacuum pump; said tank having inlet and outlet openings and another opening adjacent said inlet opening, an inlet tube on said accumulator and provided with a check valve for said inlet opening, a spring for seating said valve, a diaphragm closing the adjacent opening, said diaphragm having means secured thereto for opening said valve when the tank is under a predetermined degree of vacuum; a discharge pipe extending from said vacuum pump; a gravity check valve in said pipe; and a pervious receptacle at the end of said pipe adapted to collect and retain insects.

2. A vacuum insect eradication device, consisting of: an interconnected tubular frame adapted to fit into an insect control area with the tubular members disposed in the corners thereof; inwardly directed intake orifices disposed at each intersection of said tubular members; there being inwardly directed intake orifices disposed on certain of the longitudinal tubular members; a source of vacuum; a vacuum accumulator including a tank disposed intermediate said tubular frame and said vacuum source; said tank having inlet and outlet openings and another opening adjacent said inlet opening, an inlet tube on said accumulator and provided with a check valve for said inlet opening, a spring for seating said valve, a diaphragm closing the adjacent opening, said diaphragm having means secured thereto for opening said valve when the tank is under a predetermined degree of vacuum; a discharge pipe extending from said vacuum pump; and a pervious receptacle at the end of said pipe adapted to collect and retain insects.

3. A vacuum insect eradication device, consisting of: an interconnected tubular frame adapted to fit into an insect control area; there being inwardly directed intake orifices disposed at each intersection of said tubular members; inwardly directed intake orifices disposed on one of said tubular members; a vacuum pump; drive means for said vacuum pump; a vacuum accumulator including a tank, having a pervious tube connecting the intake and discharge openings disposed intermediate said tubular frame and said vacuum pump; said tank having inlet and outlet openings and another opening adjacent said inlet opening, an inlet tube on said accumulator and provided with a check valve for said inlet opening, a spring for seating said valve, a diaphragm closing the adjacent opening, said diaphragm having means secured thereto for opening said valve when the tank is under a predetermined degree of vacuum; a discharge pipe extending from said vacuum pump; a gravity check valve in said pipe; and a pervious receptacle at the end of said pipe adapted to collect and retain insects.

CLARENCE O. KNOX.

REFERENCES CITED

The following references are of record in the file of this patent:

UNITED STATES PATENTS

| Number | Name | Date |
|---|---|---|
| 790,005 | Smelser | May 16, 1905 |
| 809,228 | Stephens | Jan. 2, 1906 |
| 1,141,039 | Cox | May 25, 1915 |
| 1,328,114 | Bayer et al. | Jan. 13, 1920 |
| 1,505,914 | Witteborg | Aug. 19, 1924 |
| 1,807,550 | Rector | May 26, 1931 |
| 1,935,548 | Eggleston | Nov. 14, 1933 |
| 2,138,527 | Newman | Nov. 29, 1938 |
| 2,212,210 | Mesinger | Aug. 20, 1940 |

FOREIGN PATENTS

| Number | Country | Date |
|---|---|---|
| 100,329 | Australia | Feb. 18, 1937 |